Feb. 15, 1938.   G. R. CASSAGNE   2,108,366
DEVICE FOR TRANSMITTING MOTION
Filed Jan. 19, 1934   5 Sheets-Sheet 1

Inventor.
G. R. Cassagne
By: Glascock Downing & Seebold
Attys.

Feb. 15, 1938.  G. R. CASSAGNE  2,108,366
DEVICE FOR TRANSMITTING MOTION
Filed Jan. 19, 1934  5 Sheets-Sheet 2
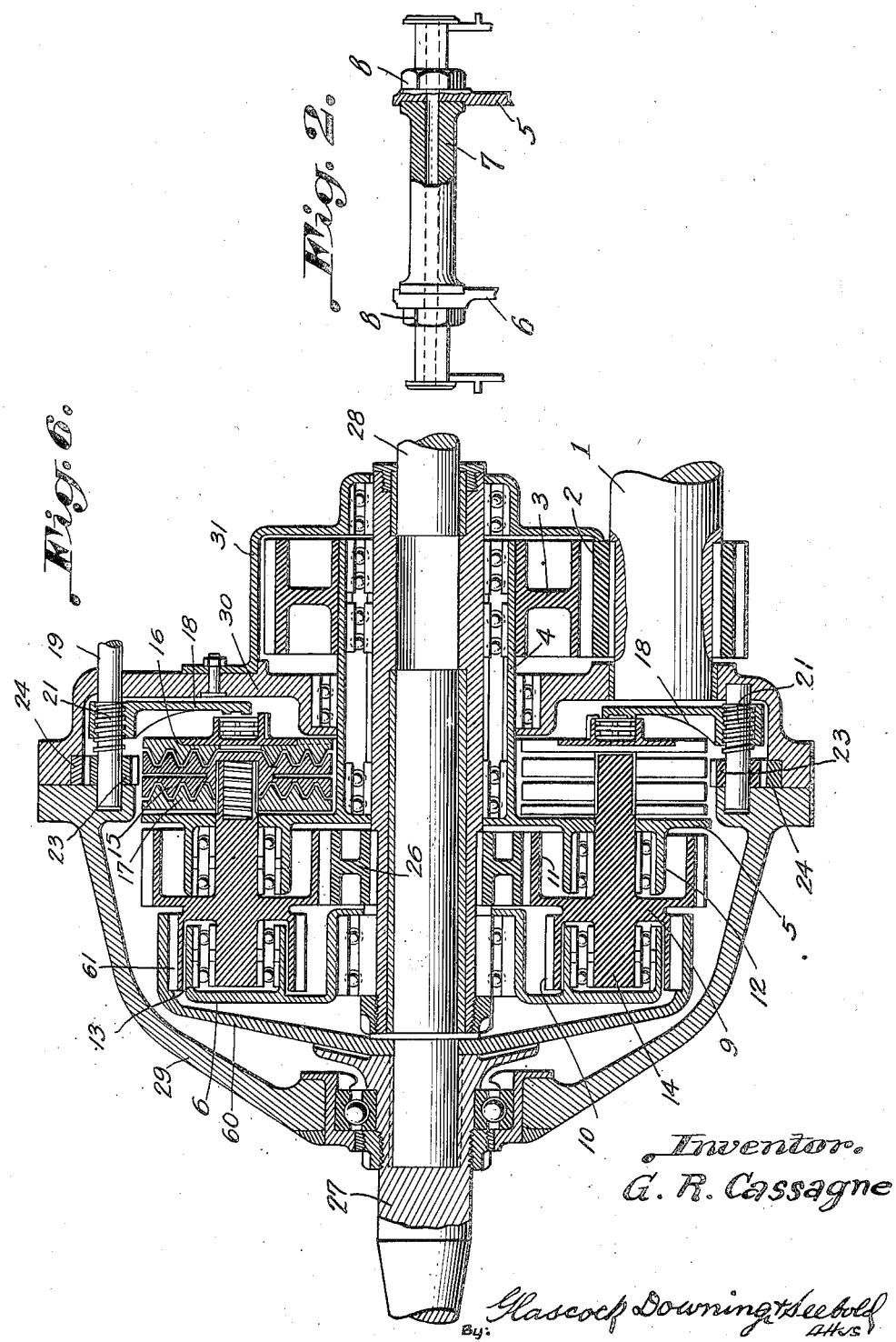

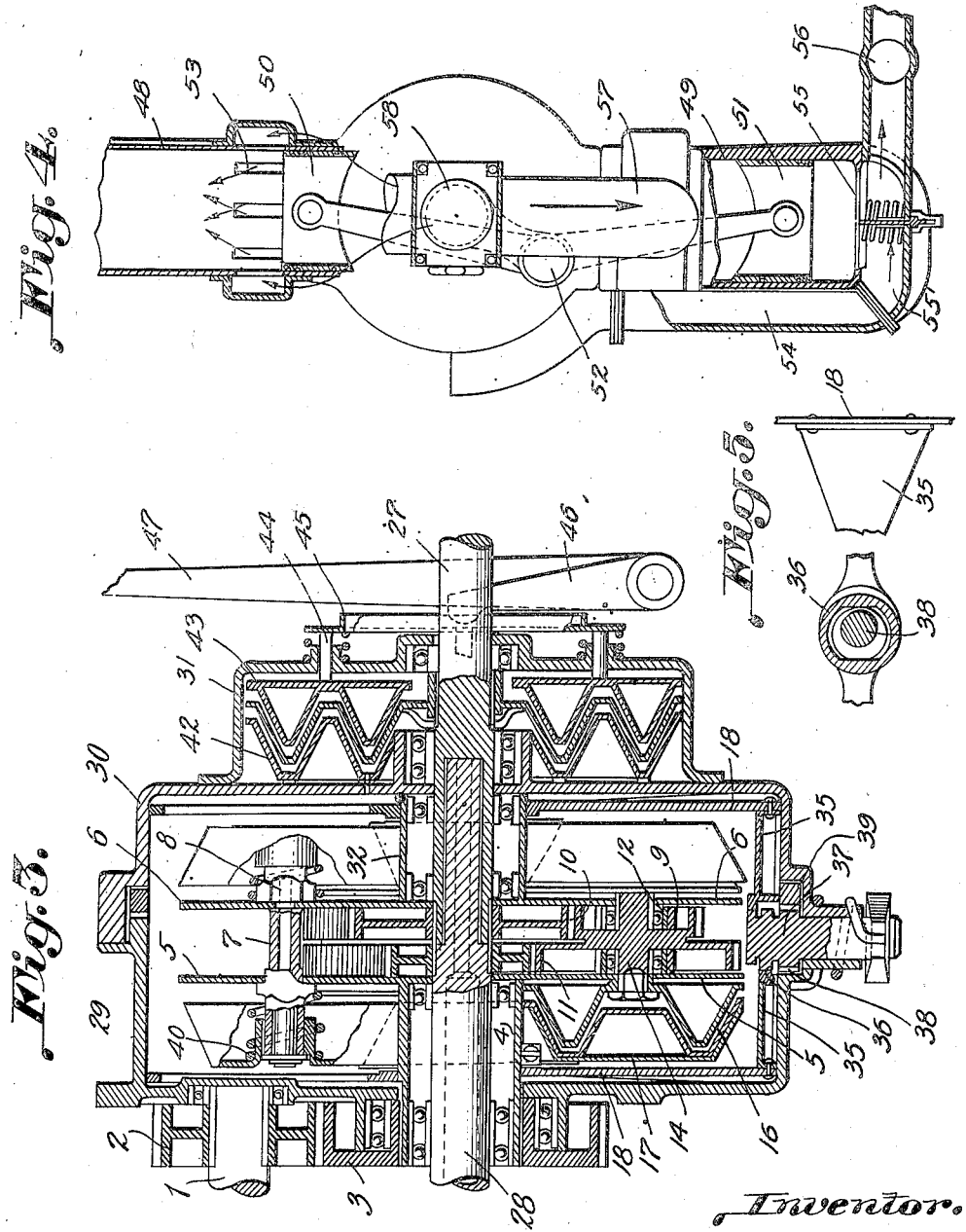

Feb. 15, 1938.  G. R. CASSAGNE  2,108,366
DEVICE FOR TRANSMITTING MOTION
Filed Jan. 19, 1934  5 Sheets-Sheet 4

Inventor.
G. R. Cassagne

By: Glascock Downing Seebold
Attys.

Patented Feb. 15, 1938

2,108,366

UNITED STATES PATENT OFFICE 2,108,366

DEVICE FOR TRANSMITTING MOTION

Georges Raymond Cassagne, Cazaux, France

Application January 19, 1934, Serial No. 707,378
In France February 8, 1933

6 Claims. (Cl. 74—295)

This invention relates to a device for transmitting motion and in particular a device applicable to an engine comprising a regulating member, so as to regulate the action of the latter according to the conditions of use of the engine.

It comprises in combination with the driving shaft on the one hand and the driven shaft and that of the regulating member on the other hand, a differential transmission permitting variations in working conditions of the regulating member to be obtained which correspond suitably to those of the driven shaft with the object of regulating automatically the power of the engine during variations in the conditions of use of the latter.

One of the two driven shafts, for example, the propeller shaft, in the case of an aeroplane, may be rigid with a drum comprising an internally toothed crown engaging with the planet wheels so as to permit suitable variations in the speeds of the driven shafts to be obtained, devices being provided in such a way as to permit the free rotation without transmission of movement of the driven shaft or the reversal of the rotation of the propeller shaft.

Embodiments of the device according to the invention are illustrated by way of example in the accompanying drawings:—

Fig. 2 is a detail of a cross stay,

Fig. 3 is a similar view to Fig. 1 of another embodiment fitted to a motor car engine.

Fig. 4 is a diagrammatic view of the compressor employed in the example shown in Fig. 3, Fig. 5 is a detail of the control for locking the planet wheels.

Fig. 8 is a modification of Fig. 6 of more simple construction.

Figure 1:
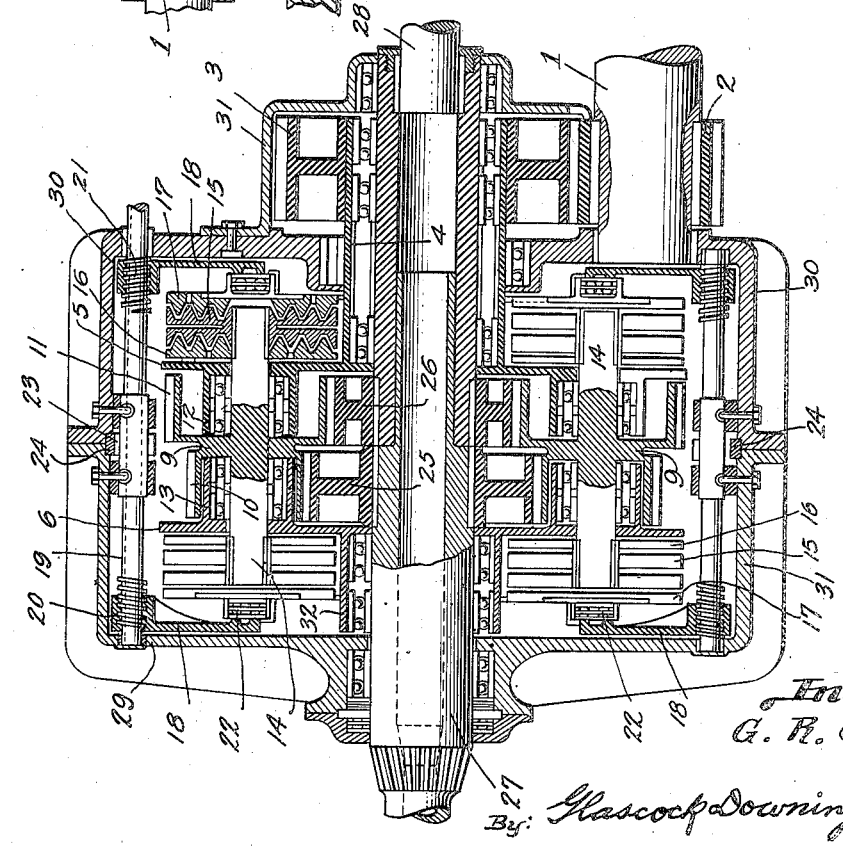
Fig. 1 is an axial section of a first embodiment fitted to an aeroplane engine.

In the example shown in Figs. 1 and 2, which illustrates a device according to the invention fitted to an aeroplane engine, the shaft of the engine 1 is rigid with a pinion 2 which is in constant mesh with another pinion 3 rigid with a sleeve 4. This sleeve carries a plate 5 connected to another plate 6, which faces it, by cross stays such as 7, Fig. 2, held by nuts such as 8. Upon these plates are mounted pinions such as 9 comprising two sets of teeth 10 and 11 of suitable chosen diameters. These pinions are carried on their shafts 14 by means of ball bearings mounted in cages 12 and 13 on the plates 5 and 6. At each end of the shaft 14 of each of the pinions 9 is mounted the movable part 15 of a friction clutch, having two fixed parts 16 and 17. The part 16 is rigid with the plate 5 or 6 and the other part 17 is rigid with a ball thrust bearing 22 upon which abuts the end of an arm 18. This arm 18 engages by means of a suitable internal thread upon the screw-threaded end 21 or 20 of a rod parallel to the axis of the device. This rod 19 carries at its centre a set of teeth 23 meshing with a toothed crown 24, the rotation of which thus drives the rod 19.

Finally, each of the sets of teeth 10 and 11 of the pinions 9 meshes with a pinion 25 or 26, the pinion 25 being keyed on the shaft 27 of the propelling member such as a propeller screw and the pinion 26 upon the shaft 28 of the compressor.

The pinion 3 and also the sleeve 4 and the sleeve 32 rigid with the plate 6 are in the example illustrated mounted by means of ball bearings upon the shafts 27 and 28 so as to permit their free rotation upon these shafts, all the elements of the device being mounted in a casing made up of a number of parts 29, 30, 31.

The operation of the device is as follows:—

In the normal position, the brake device mounted on the shaft of the pinions 9 is out of action and the plates 16 and 17 are separated from the plate 15. The driving shaft drives the sleeve 4 through the pinions 2 and 3 and consequently also drives the plates 5 and 6.

The teeth 10 and 11 of the planet wheels 9 engage with the pinions 25 and 26 and transmit a movement to each of these pinions such that for two equal resistances on the shafts 27 and 28, these shafts rotate at equal speeds, while at the same time the sum of the torques transmitted to the shafts 27 and 28 is always equal to that transmitted by the shaft 1. This device can then be employed in the following manner:—

When the aeroplane is stationary and the engine is running, the resistance to the rotation of the propeller screw is greater than during flight, its speed is lower and consequently that of the compressor mounted on the shaft 28 is higher; this increase produces an increase in the power developed by the engine corresponding to an increase in its speed and improves the conditions for taking off and rising.

When the aeroplane is in horizontal flight, an equilibrium is established between the speeds of the compressor and the propeller screw and this equilibrium is maintained as long as the external conditions remain unaltered.

When the aeroplane has to fly at a high altitude, the pilot by a suitable operation, increases the output required from the compressor. The resulting supplementary resistance on the shaft 28 then produces, by differential reaction, an increase in the speed of the shaft 27 and consequently of the propeller, thus permitting the latter to adapt itself to the new conditions of air density. The reverse operations are produced in the contrary case when the aeroplane is descending; on landing, the pilot locks the shaft of the compressor 28 in a suitable manner and the pinion 26 mounted on this shaft then functions as a reverser so that the shaft 27 turns in the opposite direction, thus producing a braking action on the aeroplane and reducing the length of its run on the ground.

In this case, the engine which is deprived of the compressor, draws in atmospheric air directly through automatic valves suitably mounted upon the air headers. If, for any reason, the shaft 28 or the compressor is damaged, thus preventing this shaft from turning, the pilot by a manipulation of the toothed crown 24, actuates the arm 18 through the medium of the rods 19 and these arms actuate the locking devices formed by the plates 15, 16 and 17 so as to lock the planet wheels and make the arrangement then function as a simple reduction gear.

In the embodiment shown in Figs. 3 to 5, which illustrate a device more particularly suitable for a motor vehicle engine, the same elements are employed as in the example shown in Figs. 1 and 2. The shape of the brake devices formed by the plates 15, 16, and 17 vary slightly and springs 40 are arranged in such a way as to disengage the plates automatically, the entry into action of these devices being produced by arms 18 connected to links 35 carrying at their ends an eccentric sheave 36 rigid with a pinion 38 engaging with a toothed circular crown 39, Fig. 5. The rotation of the toothed crown 39 drives the pinion 38 and by the rotation of the eccentrics 37 moves the links 35 and the arms 18 inwards or outwards.

Further, a device for locking the shaft 27 may be operated by the driver. It comprises a plate 41 rigid with the shaft 27, for example by keying, and arranged between two plates 42 and 43. The plate 42 is rigid with the casing and the plate 43 can move under the action of pins 44 rigid with a crown 45 acted upon by suitable return springs and upon which bears a lever 46 controlled by a pedal 47. The arrangement is also mounted in a casing 29, 30, 31.

Fig. 4 illustrates diagrammatically and by way of example, the compressor employed in combination with the device shown in Fig. 3. This compressor is composed of two cylinders 48 and 49 in which move two pistons 50 and 51 operated by the rotation of a crank 52 keyed upon the shaft 28. The air drawn in through the valve 58 and through the ports 53 formed in each cylinder is driven through a suitably loaded valve 55 into a delivery chamber 55', the delivery of which is regulated by means of a cock 56.

The operation of this embodiment of the device is the same as that of the form shown in Figs. 1 and 2, the movement of the driving shaft 1 being transmitted to the shafts 27 and 28 under the same conditions of respective speed as before.

This device is also employed in substantially the same way as the device shown in Figs. 1 and 2. When the vehicle is stationary the brake locking the planet wheels 9 is released and the brake locking the shaft 27 by the pedal 47 is applied. When the driver wishes to put the vehicle into movement, he releases the brake of the shaft 27 and at the same time admits air to the compressor of the engine through the valve 58. The opening of this valve produces an increased resistance on the shaft 28 of the compressor and as the shaft 27 has been released it commences to turn. But in admitting air into the engine the power of the latter has been increased so that the starting of the vehicle is obtained automatically until its normal speed of running is reached.

During normal running at constant power and speed, a balance is established in the device between the speeds of the compressor and the propellor shaft. When the vehicle climbs a slope, the resistance on the shaft 27 increases and the shaft 28 turns more quickly, thus increasing the supply to the engine so that the power output of the latter is increased. Moreover, the adjustable closure of the air delivery of the compressor permits the distribution of the speeds on the shafts 27 and 28 to be regulated at will in the case of very rapid or very long climbs.

When running downhill, the reverse operations are produced. The speed of the shaft 27 increases, and that of the shaft 28 falls, thereby reducing the output of the engine which slows up automatically. If the descent is very rapid, it may happen that the shaft 27 will turn more rapidly than the engine so that the shaft 28 of the compressor will rotate in the reverse direction and the transmission will then work as a free wheel.

For the operation it is sufficient to act on the admission of air and the delivery of air of the compressor. The complete closure of the air outlet causes the shaft of the compressor 28 to stop, the reversal in the direction of rotation of the shaft 27 of the propeller and consequently reverse travel. The complete closure of the air admission to the compressor makes the latter work under a vacuum and stops the shaft 27, that is to say, neutral or disengagement of the engine, the brake on the shaft 27 being always available for use. As in the preceding case when the compressor stops, the engine draws in atmospheric air through automatic valves mounted on the air intake of the carburettor or carburettors.

Figure 6:
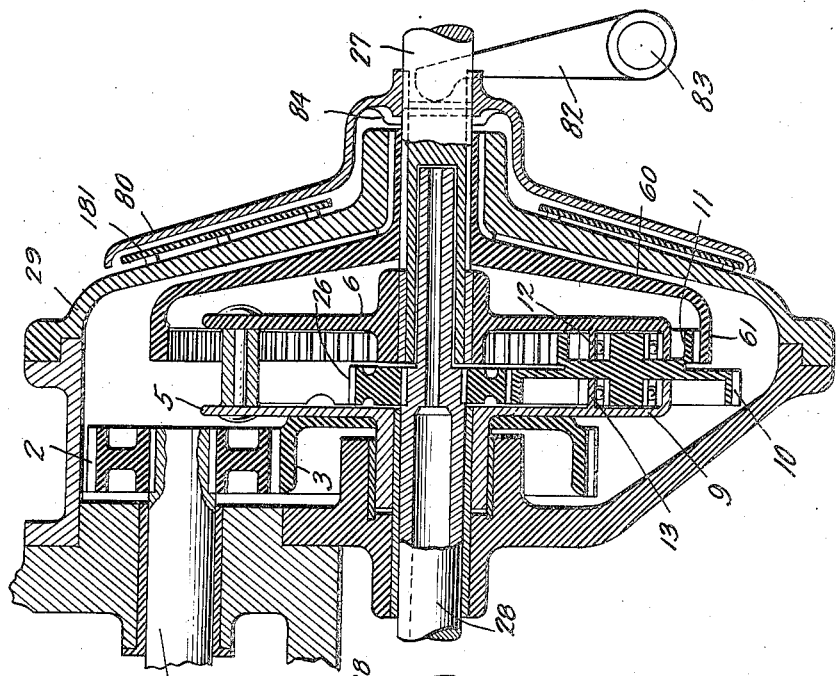
Fig. 6 is a first embodiment, of a modified form of the invention.

The transmission device illustrated in Fig. 6 comprises like the arrangement described with reference to Figs. 1 to 5, a driving shaft 1 upon which is keyed a pinion 2 engaging with another pinion 3 keyed upon a tubular sleeve 4 rigid with plates 5, 6, between which are mounted planet wheels 9 comprising two sets of teeth 10, 11.

These planet wheels 9 which are held in cages 12, 13 on the plates 5, 6, can be locked by a brake composed of plates 15, 16, 17 actuated by arm 18 operated by the rotation of a rod 19, screwthreaded at 21, and by a pinion 23 engaging with an externally toothed crown 24.

The teeth 11 of the planet wheels 9 engage also with the pinion 26 rigid with the shaft 28 of the compressor, but the teeth 10 engage with an internal crown 61 of a drum 60 keyed upon the shaft 27 of the propeller.

The operation of this device is the same as that of the embodiments indicated above, the relative speeds of the shafts 27 and 28 being proportional to the efforts which are exerted upon each of them.

This arrangement also permits, by the reversal of the relative speeds of the two shafts 27 and 28, speeds of each of these shafts to be obtained which are much higher than in the case when the two sets of teeth 10 and 11 engage with the two pinions 25, 26 as in the cases indicated above.

Figure 7:
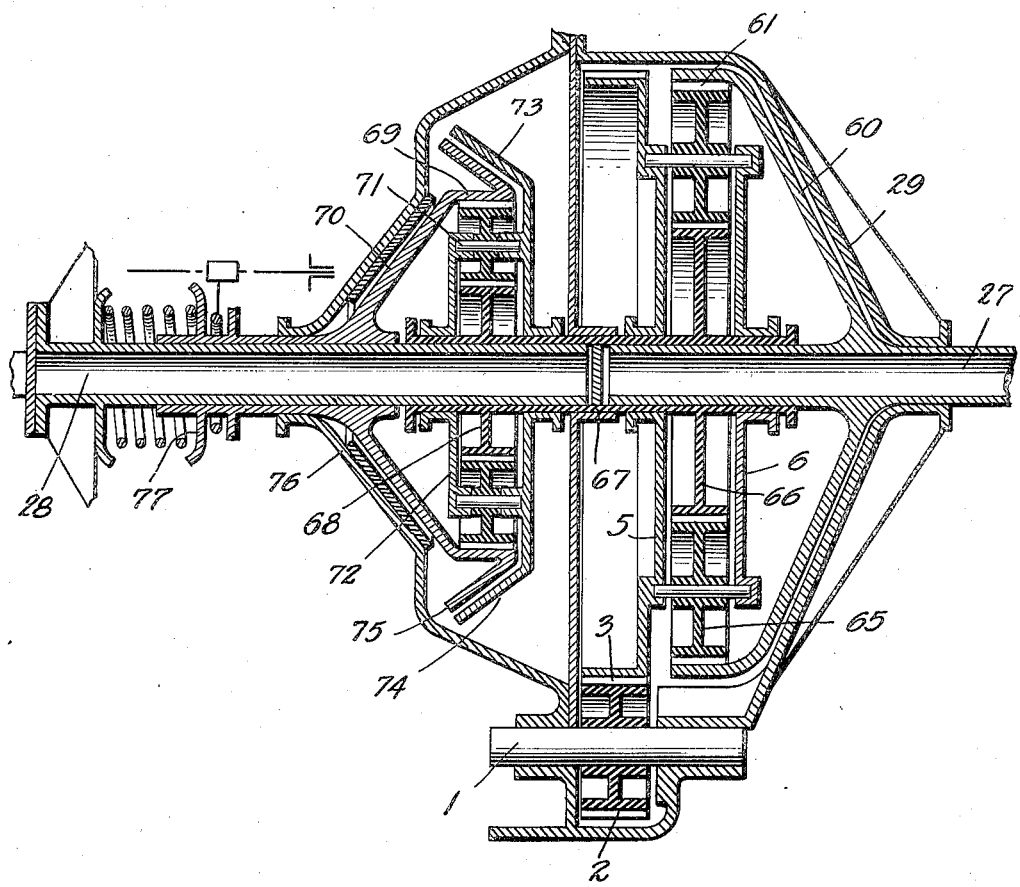
Fig. 7 is similar to Fig. 6 but illustrates a device comprising a member for reversing the rotation of the propeller shaft.

In the example indicated diagrammatically in Fig. 7, the double toothed planet wheels are replaced by planet wheels 65 having a single set of teeth which are also held between plates 5 and 6, the rotation of which is controlled by the pinions 2 and 3 and the driving shaft 1. The pinions 65 engage on the one hand with a toothed wheel 66 and an internally toothed crown 61 rigid with a drum 60 itself keyed upon the driven shaft 27. The toothed wheel 66 is rigid with a tubular sleeve 67 carrying a second pinion 68 of a differential device permitting the compressor shaft 28 to be actuated by pinions 71 carried by plates 72, 73 and engaging with a toothed crown 69 of a drum 70. This drum 70 can occupy different positions by sliding on the shaft 28 upon which it is keyed, either so that a conical surface 75 formed on its periphery will engage with a corresponding conical part 74 of the plate 73 or, inversely, so that the part 70 of the drum will engage with the casing 76 provided with suitable linings. These movements of the drum 70 are obtained by means of a suitable control 77.

The operation of the arrangement is then as follows:

The engine driving the shaft 1 rotates the plates 5 and 6 and the planet wheels 65. The latter which are in engagement with the wheel 66 and the toothed crown 61 rotate these members, thus driving the shaft 27 and the sleeve 67. By means of the latter and the planet wheels 71, the drum 70 and the shaft 28 are rotated. With the device in the position shown in the figure, that is to say with the drum 70 in the central position, there is nothing to prevent the rotation of the sleeve 67 so that the shaft 28 of the compressor no longer turns, the arrangement works as a free wheel and no movement is transmitted to the shaft 27.

If, by means of the control 77 the two cones 75 and 74 are brought into engagement, these two cones can no longer turn with respect to each other; the drum 70 is made rigid with the sleeve 67 and with the toothed wheel 66; the shaft 28 of the compressor is driven while at the same time the shaft 27 is given a movement of rotation at a determined speed.

On the contrary, if the drum 70 is in contact with the casing 76 this drum is held stationary, thereby producing an opposite rotation of the pinion 67 and of the toothed wheel 66 and also an opposite rotation of the propeller shaft 27. This arrangement is particularly useful on aeroplanes when landing for the purpose of braking the speed of the engine.

Fig. 8 shows a construction of a simplified apparatus. The shaft 1 is connected by the pinions 2 and 3 to the plates 5 and 6 carrying the planet wheels 9 having two sets of teeth 10 and 11, the teeth 10 engaging with the pinion 26 keyed on the shaft 28 and the teeth 11 engaging with the internally toothed crown 61 of the drum 60 keyed to the shaft 27. This shaft 27 also carries a plate 80 adapted to come into contact with the casing 29 through the medium of suitable linings 81.

The necessary movement of the plate 80 is obtained by means of a lever 82 connected to a pivot 83, and a spring 84 tends to hold the plate 80 away from the casing 29. When the plate 80 is brought into contact with the casing 29 its movement is stopped and thereby the shaft 27 is also stopped.

If, under these conditions, the compressor is keyed upon the shaft 1 and the engine upon the shaft 28 while the propeller remains keyed on the shaft 27, the direction of rotation of the propeller shaft 27 can be reversed by immobilizing the compressor, not shown, which is keyed upon the shaft 1. Further, the propeller shaft 27 may be immobilized by means of the brake formed by the plate 80.

Figure 9:
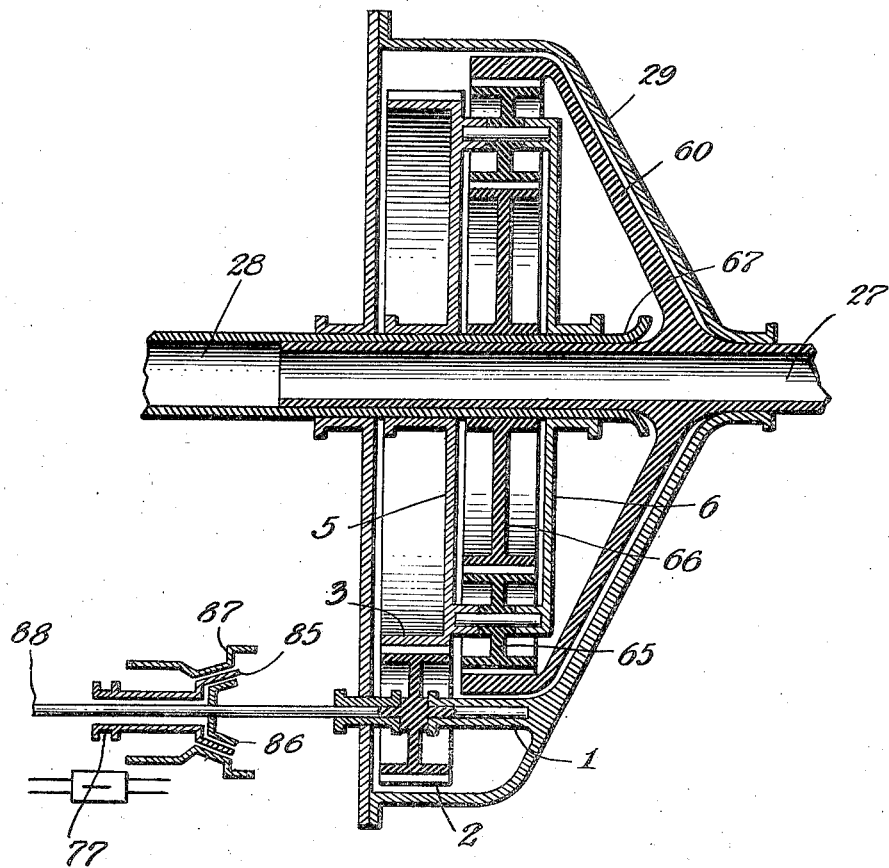
Fig. 9 is a diagrammatic section of a device similar to that shown in Fig. 6.

Finally, the embodiment illustrated diagrammatically in Fig. 9, is a modification of that shown in Fig. 8. In this case, the shaft 1 is rigid with a cone clutch 86 which is adapted to engage with a movable cone clutch 85 controlled by a suitable device 77 similar to that shown in Fig. 7. This cone 85 is rigid with a shaft 88, controls the compressor directly or otherwise and a third cone clutch 87 with which the movable cone 85 can also engage is fixed and rigid, for example, with the casing.

The operation is then as follows and is similar to that of the embodiment shown in Fig. 8.

The rotation of the engine which is keyed on the shaft 28 produces the rotation of the shaft 27 of the propeller and that of the shaft 1 which drives the cone 86.

With the movable cone 85 in the central position, that is to say, engaging with neither of the cones 86 and 87, the arrangement operates freely and the shaft 27 which ceases to be driven, no longer turns or turns freely. If the cone is brought into engagement with the cone 86 rigid with the shaft 1, the shaft 88 and the compressor are actuated directly; the shaft 27 turns at a speed which is a function of the resistance applied to the shaft 88. If the cone 85 is brought into engagement with the fixed cone 87, the compressor is then immobilized and the shaft 27 turns in the opposite direction to the previous case.

These devices thus permit the output of the engine to be adjusted to suit the work required from the engine under the different conditions of use, so that the running of the latter is simplified and requires fewer manual operations. The transmission gears may be internally or externally toothed and may be spur or other gears.

The invention is applicable to explosion engines comprising a compressor and in a general manner to all engines comprising a power regulating device which has to be actuated according to the variations in the working conditions of the engine.

What I claim is:—

1. A device for transmitting motion with automatic and continuous change of speed comprising a motor shaft, a driven shaft, a regulator device having a compressor shaft operated by said motor and aligned with said driven shaft, and manually operated means for putting said regulator device into operation or throwing it out of operation whereby the available power-output of the engine is regulated according to demand and a constant balance secured between the resistance to be overcome and the power to be given wherein the driving connection between the motor shaft on the one hand and the compressor shaft on the other hand comprises two planet wheels, and wherein is mounted a drum having an interially toothed crown and means operated by said toothed crown for causing suitable variations of the driven shafts, and means for preventing the transmission of the rotation of the motor shaft to the driven shaft when desired.

2. In a variable speed gearing, a motor shaft, two secondary shafts, toothed wheels keyed on said motor shaft and said secondary shafts, means for impressing on said secondary shafts an automatically controlled distribution of the power furnished by the motor shaft, comprising complementary toothed wheels located between said motor shaft and one of the secondary shafts for providing said last named secondary shaft with a rotating speed, the variations of which are always different from those of the other secondary shaft, and means for preventing rotation of said complementary toothed wheels so that said last named secondary shaft constituting a regulator may be either connected with the motor shaft or separated from the same, or maintained stationary.

3. A device according to claim 2, in which the means for impressing on the secondary shafts an automatically controlled distribution of power, includes sun and planet gears provided between said motor shaft and said secondary shafts, and in which a toothed wheel on said motor shaft meshes with a toothed wheel on one of said secondary shafts revolving said planet gears about said motor shafts, conjugated circular brakes provided on said planet gears for resiliently braking all said planet wheels at the same time, a controlling device for said braking means whereby the cancellation of repartition of torques and speeds of one of said secondary shafts may be obtained, the device then operating as a speed reducing device.

4. In a device according to claim 2, a shaft connected with a compressor, toothed gears connecting said motor shaft with said compressor shaft, said compressor having a conduit extending therefrom to said motor, said compressor being located between the carburetor and the motor cylinders, whereby speed modifications may be obtained upon the other secondary shaft in proportion to the load imparted to the compressor and to the corresponding power of the motor.

5. In a variable speed gearing, a motor shaft having a gear, two secondary shafts, gearing connecting said motor shaft with said secondary shafts for automatically controlling the distribution of power supplied by said motor shaft, said gearing comprising a sun gear keyed to each of said secondary shafts, said two gears being of different diameters, a carrier mounted for rotation on said secondary shafts, the said carrier being provided with pinions meshing with said sun gears, the said planet pinions being mounted for simultaneous rotation in said carrier, the said carrier being provided with a gear meshing with the gear on said motor shaft, and clutch means controlling the rotation of said pinions.

6. A device as claimed in claim 5, comprising a motor, a compressor operated by one of said secondary shafts, a conduit from said compressor to said motor, said compressor being located between the carburetor and the motor cylinders, whereby speed modification may be obtained upon the other secondary shaft in proportion to the load imparted to the compressor and to the corresponding power of the motor.

GEORGES RAYMOND CASSAGNE.